United States Patent [19]

Malin

[11] Patent Number: 5,111,392
[45] Date of Patent: May 5, 1992

[54] DESIGN SYSTEM FOR CREATING FURNITURE LAYOUTS

[75] Inventor: Stuart B. Malin, Chicago, Ill.
[73] Assignee: Steelcase Inc., Grand Rapids, Mich.
[21] Appl. No.: 363,676
[22] Filed: Jun. 9, 1989
[51] Int. Cl.⁵ .............................................. G06F 15/60
[52] U.S. Cl. ..................................... 364/401; 364/400
[58] Field of Search ................................ 364/401, 400

[56] References Cited

U.S. PATENT DOCUMENTS 4,642,780  2/1987  Thomson ........................... 364/512
4,700,317  10/1987  Watanabe et al. .................. 364/488
4,829,446  5/1989  Draney ............................. 364/488

OTHER PUBLICATIONS

Hufnagel Software: Roomer 2 (ver. 2.0) Nov. 1, 1988.

Primary Examiner—Jerry Smith
Assistant Examiner—Russell Cass
Attorney, Agent, or Firm—Price, Heneveld, Cooper, DeWitt & Litton

[57] ABSTRACT

A process for designing an arrangement of furniture pieces from a predetermined system of furniture. The process can be initiated by selecting a predetermined thought starter shape or can be started by designing a beginning shape by selecting furniture element shapes from the system of furniture and combining them to form a basic shape. Once the basic shape has been selected, it can be modified, expanded, contracted, and replicated as desired within implementable increments consistent with the system of furniture. The program highlights where storage, privacy and electrical elements can be placed. At any time the finish, color, and fabric to be used can be determined. An updated cost and bill of materials is provided on the completion of each step of the design process including color, fabric and finishes.

9 Claims, 5 Drawing Sheets

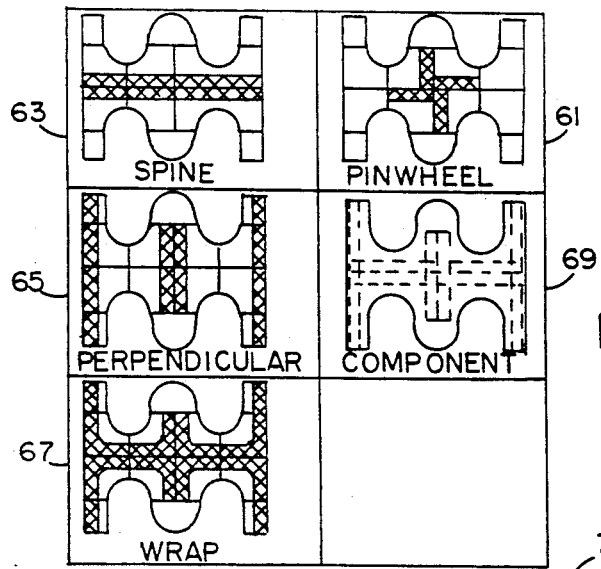
FIG. 8
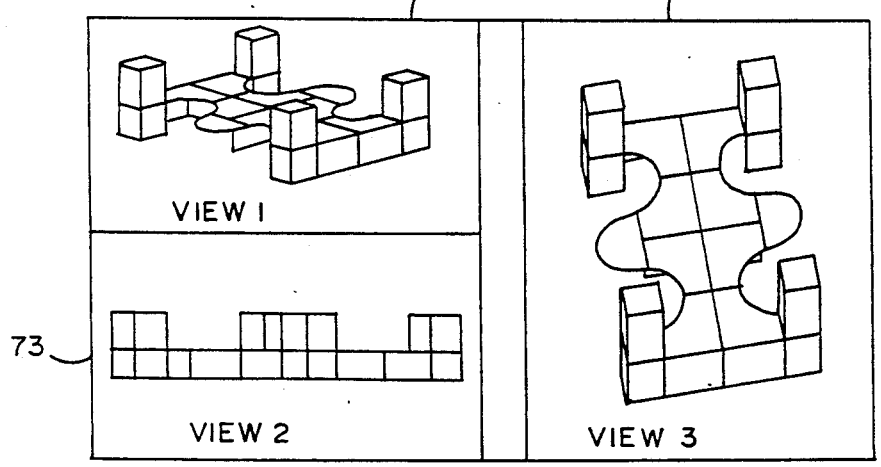
FIG. 9
| BILL OF MATERIALS-ISLAND A ||||| 
|---|---|---|---|---|
| QUANTITY | STYLE NUMBER | DESCRIPTION | UNIT LIST | EXT. LIST |
| 24 | X213012391 | CORNER CORE 42x42 | $750.00 | $18,000.00 |
| 24 | X212312312 | SPANNER TABLE | $550.00 | $13,200.00 |
| -- | | | | |
| -- | | | | |
FIG. 10

DESIGN SYSTEM FOR CREATING FURNITURE LAYOUTS

BACKGROUND OF THE INVENTION

The present invention relates to a method for speeding up the creation of implementable furniture layouts based on a system of furniture products.

It is the usual practice in designing a furniture layout for an office, a hospital, a cafeteria, or any other space which is to be occupied to begin with a blank sheet of paper on which the outer dimensions of the area to be furnished are laid out. The designer then uses paper cutouts or writes directly on the paper layout in attempting to efficiently design the furniture for the intended purpose. In starting this way, much time is lost getting started. The designer must start from scratch or from previous experience or drawings that have been saved from other jobs. As the design progresses, the designer is required to know what piece of furniture can be attached to another or stand next to another. He also has to be aware of the small hardware pieces and electrical elements that have to fit together for a complete furniture layout. If, in the course of the design, the designer wishes to change the shape of one or more of the pieces of furniture, he or she is required to start with a new sheet of paper if writing directly on the paper. If the designer is using paper cutouts, he or she has to change the piece and then see if all the other pieces will fit with the changed piece. In the course of making all these changes, the designer has to be constantly conscious of the fact that what is designed has to be within the catalog of the supplier or manufacturable. p Some of the aforementioned steps can be carried out on a computer, however, the designer is still dealing with the same type of problems. The designer is merely substituting a CRT screen for a blank sheet of paper.

The designer accomplishes nothing if, when the task is completed, the pieces of furniture do not exist in the size and shape called for in the drawing or cut-out plan. Also, when the design is completed, a lengthy process is required to count and determine what parts are required to build the furniture design. The designer must then go through the entire catalog of furniture pieces specifying the color and finish required. It is obvious from the above description that it is an extremely difficult task to efficiently design a furniture layout in view of the many variables and numerous parts that have to be taken into consideration to complete the task.

SUMMARY OF THE INVENTION

In accordance with the present invention, an automated approach to speed up the creation of implementable office furniture layouts is provided. The process allows designers to treat real furniture components in an abstract way without worrying about all of the parts and pieces which will be required to install the complete furniture configuration. The designer is also saved the extensive time and work required to understand the furniture product line and all its details. In addition, the process provides for rapid change or modification of the plans within implementable limits. The procedure enables the designer working with a standard system furniture product to design the furniture layout and determine the cost of the selected layout as each step of the design process takes place without having to supply additional information to the computer before the bill of materials can be generated.

The process contemplates the use of a software implemented design technique in which the designer selects a basic shape for the furniture from a library of predetermined shapes. The designer then selects a furniture configuration that fits the basic shape requirements. Within this program, the selected furniture configuration is refererd to as an island. The designer can then modify the selected furniture configuration to increase or decrease the width or length of any portion of the configuration. Also, any portion or all of the selected configuration can be replicated. As the design progresses, the ends of the furniture islands must be determined; and to facilitate the solution to this problem, a selection of legal, that is, implementable, endings are provided from which the designer can select. After all of the major furniture elements are selected the software automatically highlights the locations where storage, privacy elements and power can be placed. The designer selects the type of storage required for the activity to be carried out, the privacy elements for the degree of privacy needed, and the electrical elements needed to provide lighting and power. At any time during the design process the designer can select the finish, color, and fabrics needed for the complete design or any portion of the designs. After the designer has selected the furniture configuration, he can determine the bill of materials and cost for that configuration. Also, through each step of the design, after deciding on a basic configuration, right up to the last step the designer can be provided with an updated bill of materials and costs.

BRIEF DESCRIPTION OF THE DRAWINGS

FIG. 8 illustrates the placement of storage, privacy, and electrical elements;

FIG. 9 illustrates the macro visualization of a plan in progress; and

FIG. 10 is a representative bill-of materials.

DESCRIPTION OF THE PREFERRED EMBODIMENT

The software for the design process of the present invention has been designed and implemented on an Apple MacIntosh computer system. Other computer systems of similar capability can also be used to implement the process. The process is not hardware or code dependent and is, therefore, illustrated in flow chart and example form to provide a full understanding of the invention. While the process is illustrated using office furniture, it is also applicable to other furniture designs.

The process is particularly suitable for use with a system of furniture products, that is, a full line of pieces, parts, and components from the largest to the smallest, all designed for use together in a single overall furniture design. The Steelcase Corporation, assignee of the instant application, has implemented the software for use with its Context, Trademark, line of furniture products. Context office furniture is a freestanding line of furniture products. In the full line of furniture products, pieces of furniture are available in various sizes, shapes, and configurations as well as finish and color. A range of fabrics has also been predetermined for use with the furniture. All of the components necessary to implement a complete furniture design have been predetermined so that the designer can work in the abstract without worrying about the realities of the underlying furniture components.

Figures 1A, 1B:
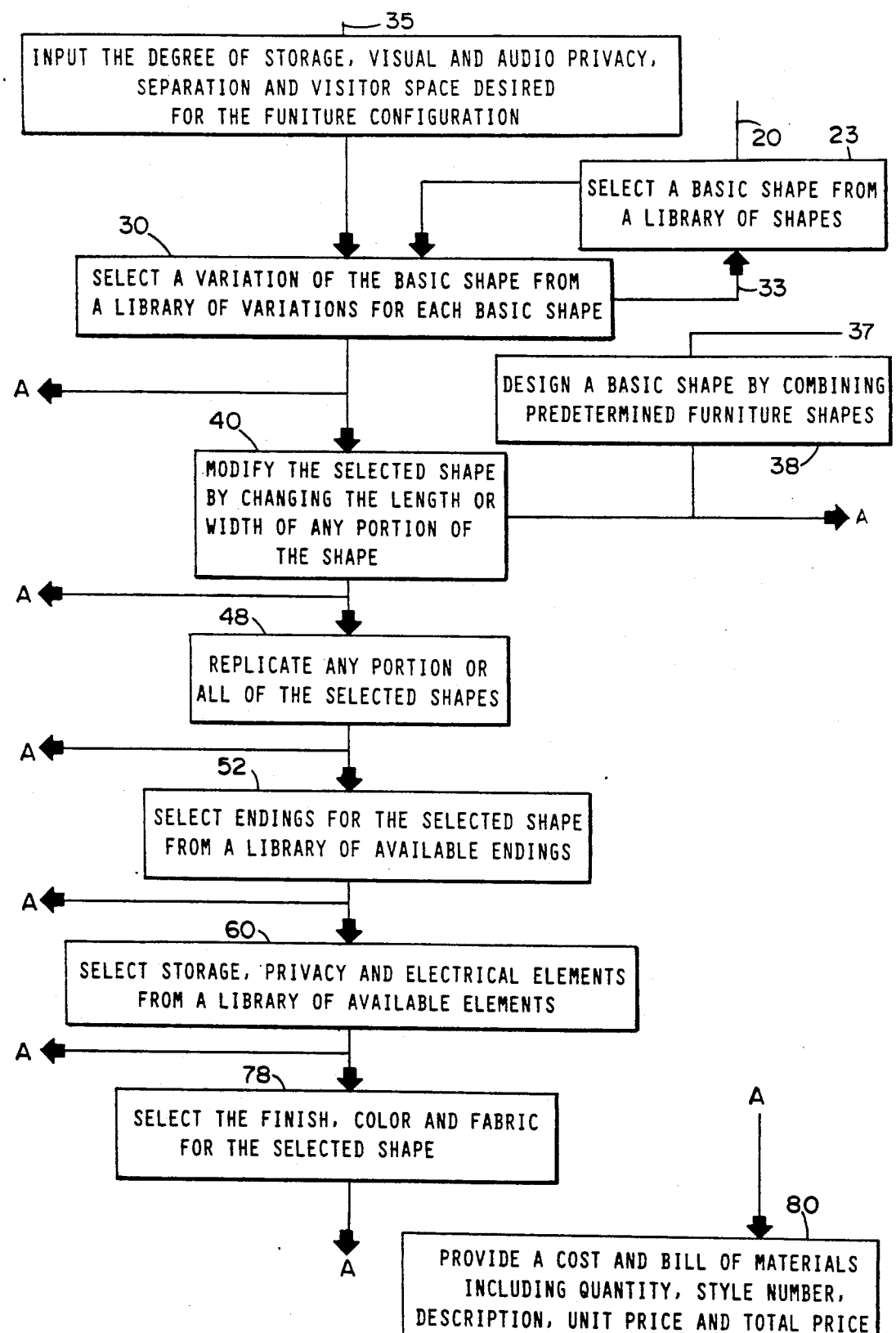
FIG. 1a is a flow chart of the process of furniture design of the present invention.
FIG. 1b shows the subroutine for costing and preparation of the bill of materials of the present invention.
Figure 2:
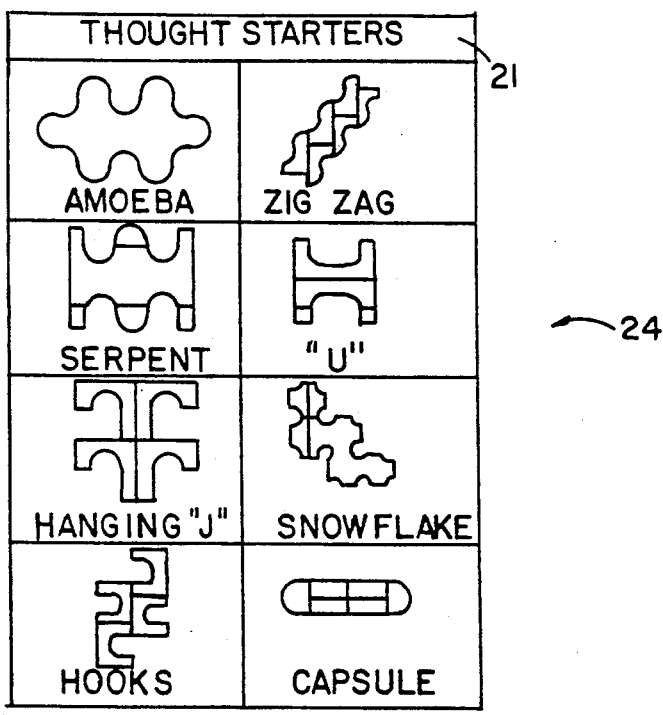
FIG. 2 shows a selection of basic furniture islands or thoughtstarters.
Figure 3:
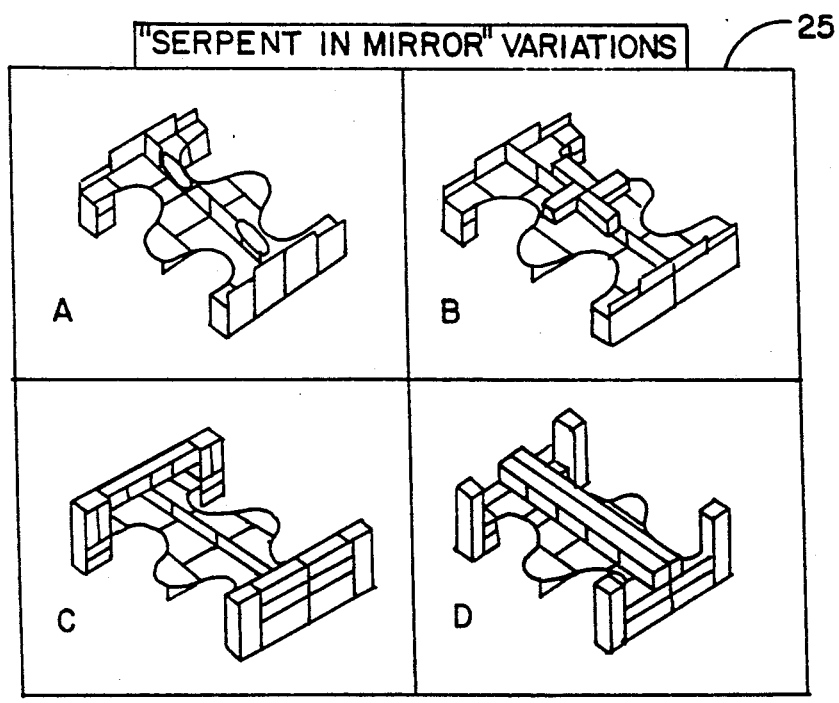
FIG. 3 is an example of variations of a selected basic shape.

In the preferred embodiment, referring to FIG. 1a, the designer accesses the computer system at 20 by calling up on the screen of the computer a selection of thought starters 21, as shown in FIG. 2, which are plan views of implementable basic furniture shapes. The thought starters are meant to assist the designer in approaching the layout of the furniture. The designer is faced with a blank sheet of paper outlining the space to be occupied and must take the first step in the design process. The designer selects a basic island shape at step 23 in the flow chart (FIG. 1a) by entering the name of the shape into the keyboard or by moving the pointer 24 (FIG. 2) over to the icon representing the shape. After the designer has selected the basic island, referring to FIG. 2, the software presents on the screen of the computer isometric views 25 (FIG. 3) of several variations of the basic island selected. Each of the variations 25 is a legal, that is, an installable or implementable configuration. In the example, the designer has selected the serpent basic shape and in FIG. 3, four variations of the "serpent in mirror" are presented for consideration.

Figure 4:
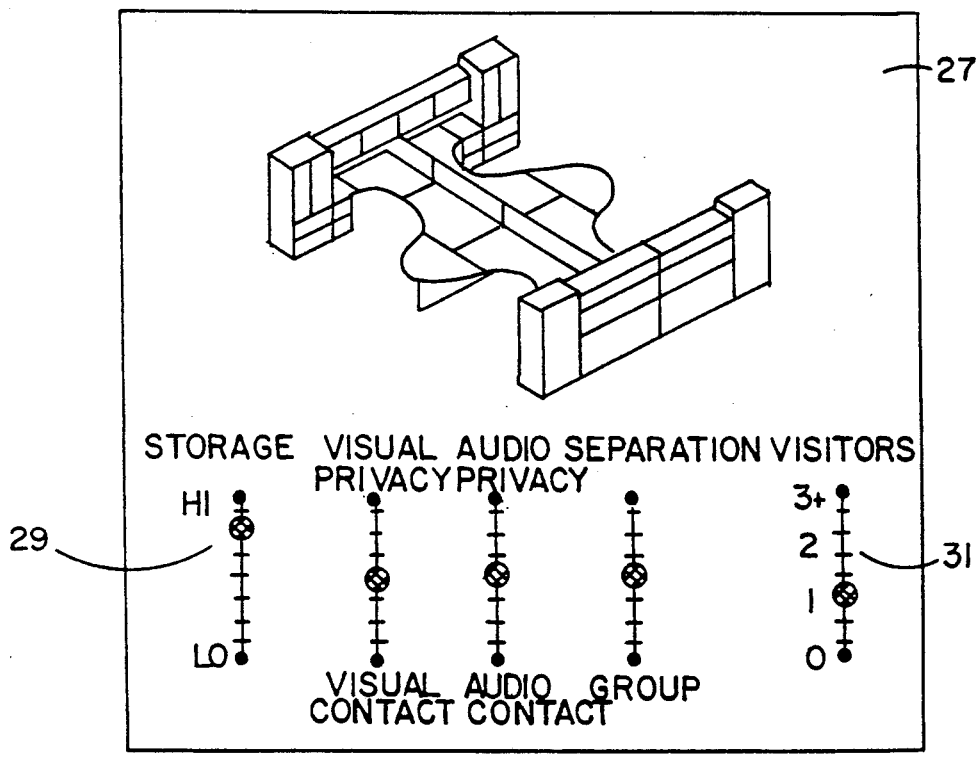
FIG. 4 shows an isometric view of a variation as shown in FIG. 3 along with the rating indicated for several characteristics as determined by the designer of the furniture variation.

If the designer, after viewing the isometric view of the available furniture variations, is unclear or unable to make a selection, the designer can take each variation presented, referring to FIG. 4, and view a macro isometric view 27 along with the ranking provided by the designer of the basic configuration in each of several different characteristics. The designer of the variation of the basic configuration shown has ranked the configuration on a scale 29 from low to high for the amount of storage available, visual privacy, audio privacy and separation. As can be seen in FIG. 4, variation C of the "serpent in mirror" ranks high in storage space, medium in visual and audio privacy, and medium in separation. The visitor space is presented on a scale 31 from zero to 3+. The designer has ranked the "serpent in mirror" configuration as having in each bay space for comfortably seating one visitor. The system will also calculate objective criteria, such as square footage, counter space, etc., to assist the designer. After reviewing each of the variations of FIG. 3 in the manner illustrated in FIG. 4, the designer can then select the basic furniture configuration desired.

As shown in the flow chart (FIG. 1a), in the event the designer does not like the initial configuration selected, the designer can, as shown by line 33, start the process over by selecting another basic shape. The process can be repeated for each basic shape until the designer settles on an acceptable shape. The designer can also access the design program at 35 by using the same criteria as shown in FIG. 4 and inputting the designer's desires as to storage, visual and audio privacy, separation, and visitor space. Once the designer has entered all of the data, the computer will suggest a basic shape or shapes on the basis of best match to the criteria established by the original designer of each basic shape. Once the computer has suggested a basic shape or shapes for the designer, it will again present the variations of that shape for the designer to consider and for the designer to select a basic furniture configuration.

The designer can also enter the design program as shown in FIG. 1a at 37 and program step 38. The designer can access a catalog of predetermined component shapes of basic furniture elements and arrive at an original implementable island within the concept of the furniture system. If the designer selects a basic shape or inputs the characteristics desired, and the computer suggests the basic shape or shapes, the program will proceed through step 30 presenting to the designer variations of the basic shape. If, on the other hand, the designer elects to design an original basic shape, the program cannot present variations of this shape.

Figure 5:
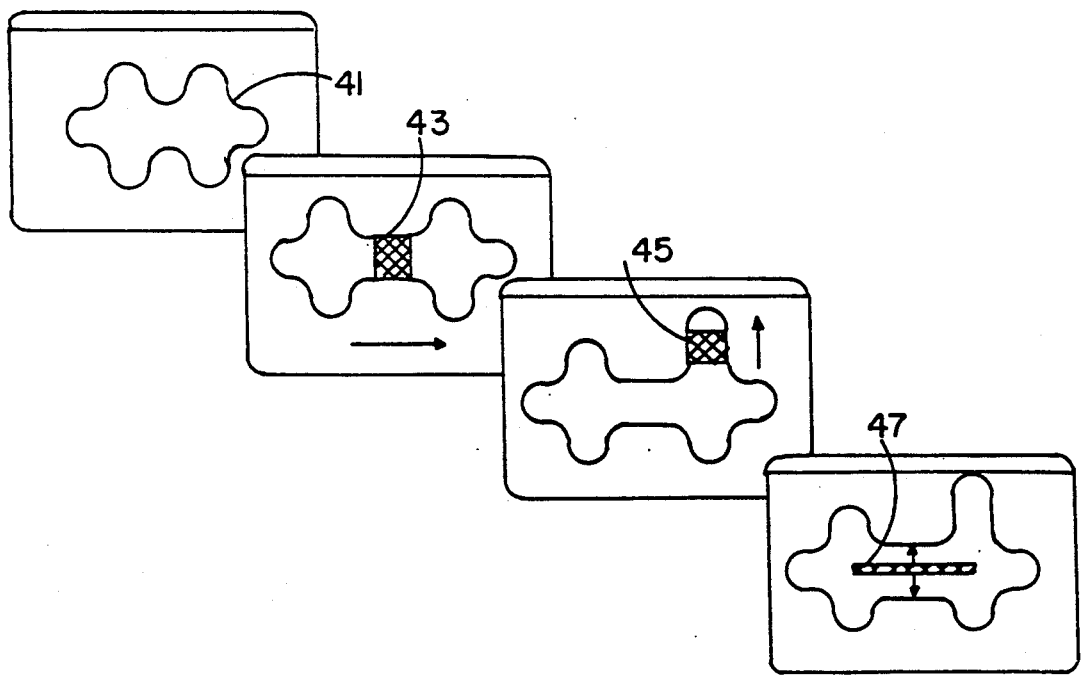
FIG. 5 shows how a basic shape can be modified.

Once the basic shape has been arrived at, whether by suggestion, computer selection, or original design, the program then proceeds to step 40 (FIG. 1a) where the designer can freely modify, as shown in FIG. 5, the length and width of any portion of the selected basic shape. As shown in FIG. 5, the basic shape 41 can have the middle portion 43 stretched in length It can also have a projecting portion 45 stretched and can have the center portion 47 increased in width. Each step of the modification is made in legal or implementable increments by accessing stored information as to the size, shape and hardware used with each implementable change. The designer does not have to concern himself as he squeezes, stretches, or pulls any portion of the basic shape that the final shape will not be implementable.

Figure 6:
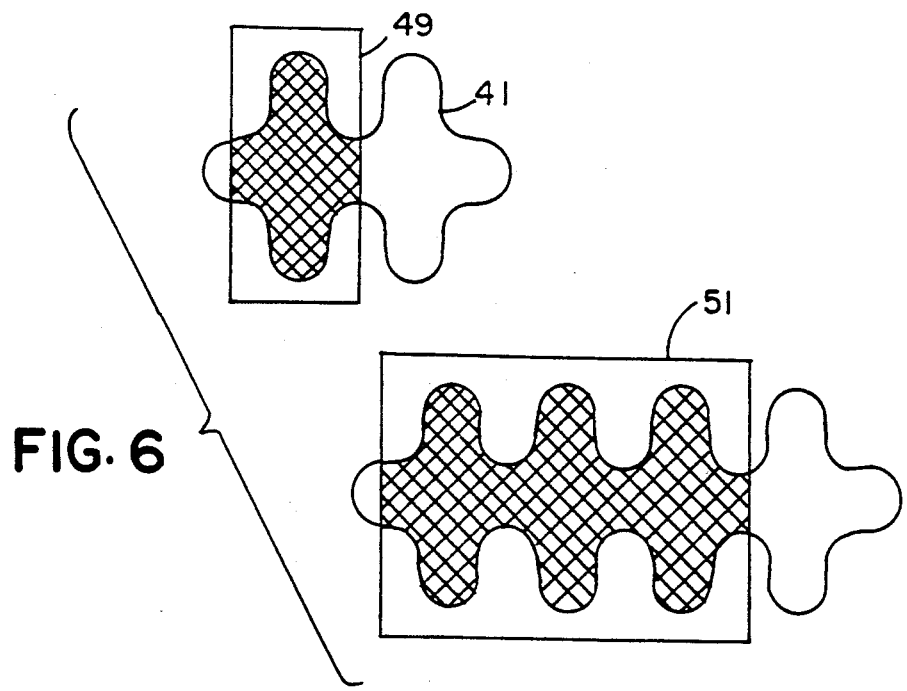
FIG. 6 shows the replication of a basic shape.

The program then moves on to step 48 (FIG. 1a) where any portion or all of the selected configuration can be replicated, as shown in FIG. 6. As can be seen in FIG. 6, the basic configuration 41 from FIG. 5 has outlined and shaded the portion of the configuration to be replicated 49. This shaded portion of the configuration is then shown being replicated at 51. As mentioned previously, any portion or all of the configuration can be replicated as desired by the designer.

Figure 7:
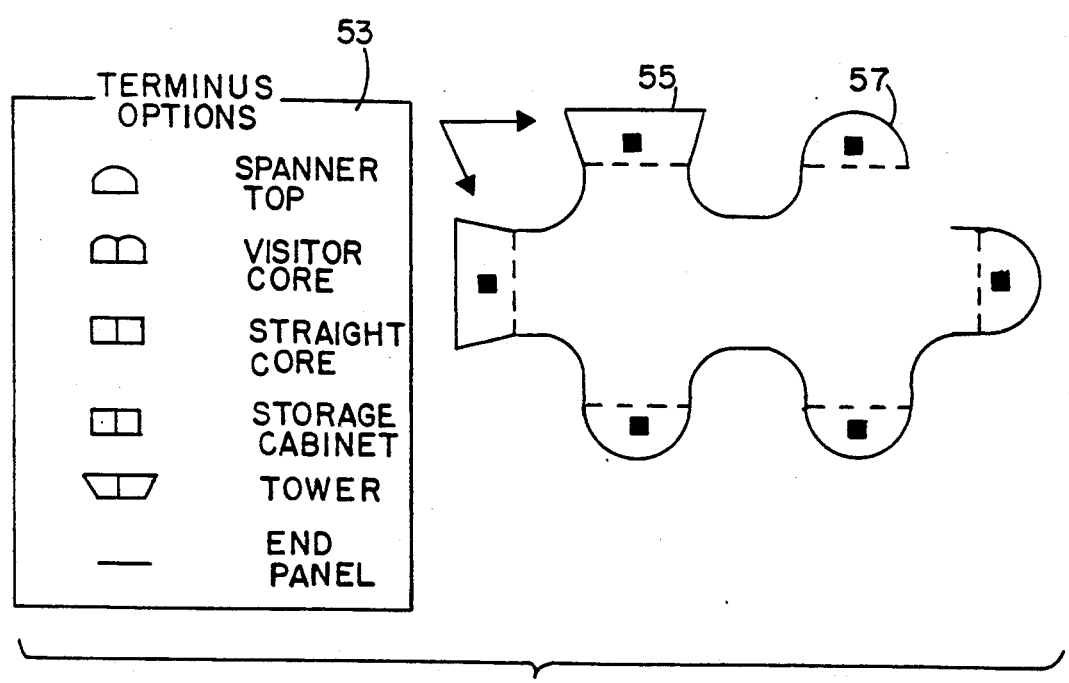
FIG. 7 is a selection of endings for a furniture shape.

The program then proceeds to step 52, referring to FIG. 1a and FIG. 7, where the designer can select ending or terminus options for each extended portion of the basic shape. The designer has complete freedom to select endings from a library 53 of legal endings. As shown at 55 and 57, the designer can have different endings for different portions of the basic furniture island configuration. Again, as the designer selects from the various end configurations presented in window 53, the designer does not have to be concerned about the legality or availability of the selected terminus. Throughout the design process, the designer only has to be concerned with the overall configuration and the design objectives.

The program then proceeds to step 60 (FIG. 1a), referring to FIG. 8, for the final selection of storage, privacy, and electrical elements. The software automatically highlights the location where storage, privacy and power can be placed. In FIG. 8, suggestions are presented for the completion of the furniture layout. At 61, a pinwheel design is shown, at 63 a horizontal spine is illustrated. At 65, perpendicular storage space is illustrated while at 67, a complete "wrap" of elements is presented. If none of these suggested patterns are acceptable to the designer, the designer can then access component tool 69. The designer can access the component tool through the computer keyboard and through a mouse in combination with a suitable pointer or cursor. The designer can move the pointer about the component tool designating the placement of each element until satisfied with the plan created.

Referring to FIG. 9, throughout the design process, the designer can call up on the computer screen macro isometric views 71, 73, and 75 of the furniture configuration being designed. These views present an overall appearance without getting down to the small elements of the design.

At any time during the design process, the finish, color, and fabrics to be used in implementing the design can be selected as shown in step 78 (FIG. 1a) and by flow chart points B. Working with a system furniture product, all of these factors have been taken into consideration so that it is only necessary for the designer in step 78 to make a selection of the finish color and fabric to be used to complete the design. The designer does not have to go through catalogs looking up each individual piece of furniture and its appropriate part identification corresponding to a particular color to complete the task. The designer needs only to make the one selection for each of the fabric, color, and finish to complete the task if this finish is consistent across the design. The designer can also select different finishes, colors and fabrics for different portions of an overall design as the design process proceeds or at the end of the process.

Referring to FIGS. 1a and 1b, after the basic furniture shape has been decided on, the computer program as shown by flow chart point A, jumps to a subroutine at step 80 to provide the designer with a bill of materials 81, FIG. 10, showing the quantity, style number, description, unit price, and total price of the furniture items and all necessary hardware to complete the task. The bill of materials can be accessed as shown in FIG. 1a after each step 30, 38, 40, 48, 52, 60 in the design process and at the end of the process. The computer program merely accesses a memory address for each element of hardware and stores the data in a cumulative register. The register is continually updated through the selection process so that the register can be accessed at any time to provide an updated bill of materials.

It is clear that a designer is saved a considerable amount of time and effort by using the process set forth above in combination with a system of furniture products. The designer needs only be concerned with the design aspects of the project and not with all of the multiple minor decisions that have to be made in implementing the overall design concept.

Though the invention has been described with respect to a specific preferred embodiment thereof, many variations and modifications will immediately become apparent to those skilled in the art. It is therefore the intention that the appended claims will be interpreted as broadly as possible in view of the prior art to include all such variations and modifications.

The embodiments of the invention in which an exclusive property or privilege is claimed are defined as follows.

1. A computer implemented method for designing and costing an interior space based on a system of furniture products comprising the following steps:

selecting a basic shape for the furniture from a library of implementable shapes;

selecting a furniture configuration for the selected shape;

modifying any portion of said selected furniture configuration to increase or decrease the width or length of said furniture configuration in implementable increments;

replicating any portion of said selected furniture configuration;

selecting the furniture components for any end of said selected furniture configuration from a collection of implementable endings;

selecting any storage, privacy and electrical elements to complete said selected furniture configuration from a library of implementable elements;

specifying the finish, color and fabrics for any portion of or the overall furniture configuration from a predetermined collection of finishes, colors, and fabrics; and making available a bill of materials in the course of and at the end of the design process.

2. A computer implemented method for designing and costing office interiors as defined in claim 1 wherein in the step of replicating any portion of the entire selected furniture configuration the entire furniture configuration can be replicated.

3. A computer implemented method for designing and costing an interior space as defined in claim 1 wherein the quantity, part number, fabric, finish, color and cost of each item is made available along with a total cost.

4. A computer implemented method for designing and costing an interior space as defined in claim 1 wherein more than one basic shape can be selected.

5. A computer implemented method for designing a furniture layout based upon a system of furniture products comprising the following steps:

selecting a basic shape on said computer representative of a grouping of furniture elements;

modifying on said computer any portion of said basic shape in implementable increments as allowed by the underlying program and the system of furniture products; and selecting furniture elements for said basic shape from those furniture elements allowed by the underlying computer program which are compatible and connectable with the previously selected furniture elements in the basic shape.

6. A computer implemented program controlled method for designing a furniture layout based on a system of furniture comprising the following steps:

selecting a furniture configuration;

modifying any portion of the shape of the selected furniture configuration in the abstract while the underlying program only allows incremental changes consistent with the characteristics of the system of furniture.

7. A computer implemented method for designing a furniture layout while obtaining updated cost data comprising:

entering into said computer one or more characteristics desired in the basic furniture shape;

selecting a basic shape from the shape or shapes suggested by the computer based on an evaluation of the characteristics desired in the basic furniture shape;

selecting furniture pieces to fill out the basic shape by selecting said furniture piece from an implementable system of furniture;

selecting any units to complete the edges of the basic shape; and making available a bill of materials in the course of and at the end of the design process.

8. A computer implemented method as set forth in claim 7, including the step of identifying where any storage, privacy and electrical elements can be placed to complete the furniture layout.

9. A computer implemented method for designing a furniture configuration based upon a system of furniture products comprising the following steps:

determining on said computer a basic shape for said furniture configuration;

manipulating on said computer any portion of said basic shape to arrive at a final shape for said furniture configuration; and completing said furniture configuration with allowable furniture elements determined by said computer which are compatible and connectable with the previously selected furniture elements in the basic shape.

* * * * *